Feb. 26, 1957
G. E. MERCER
2,782,962
SOLENOID OPERATED POWDERED MATERIAL DISPENSER
Filed March 19, 1956
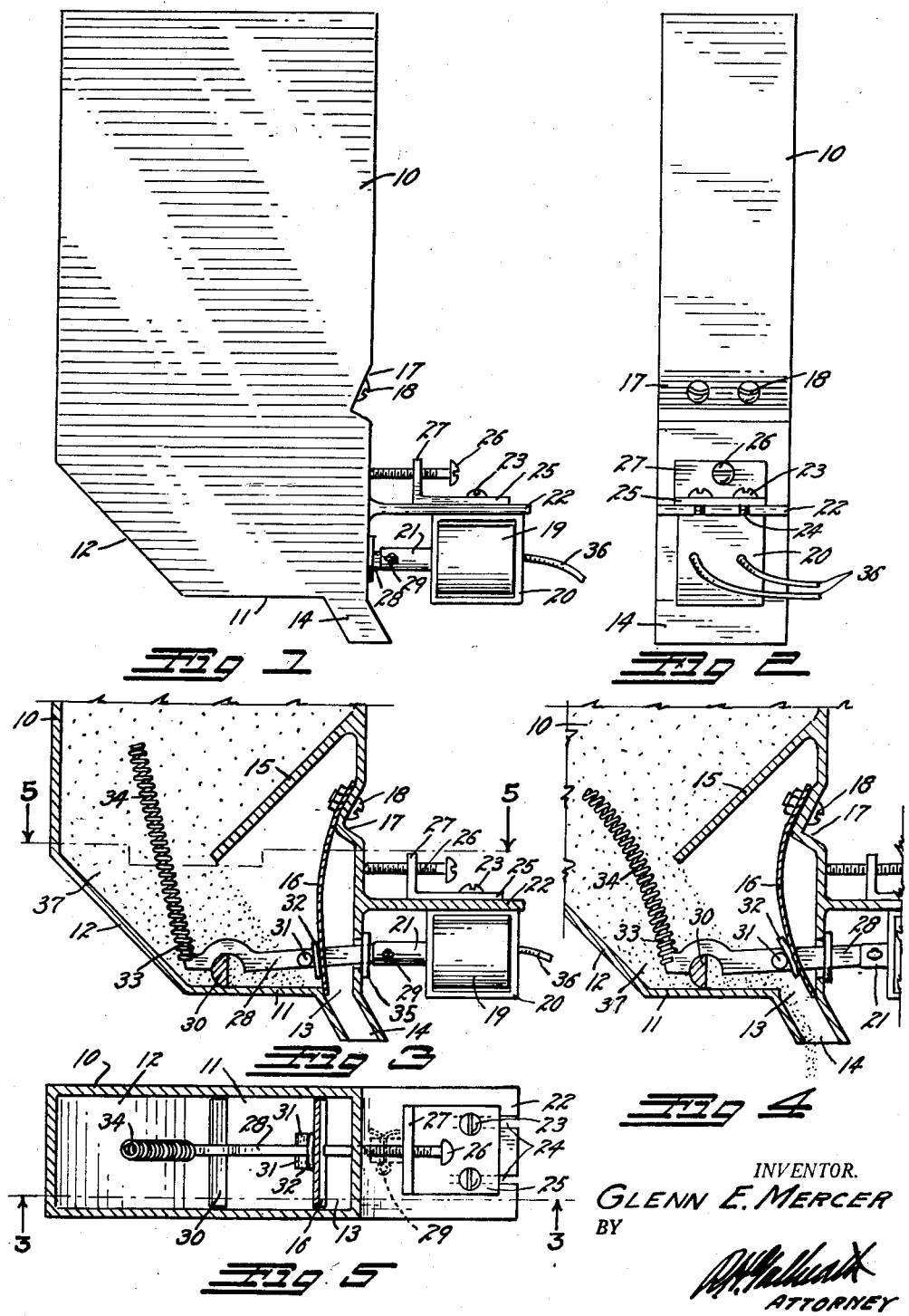
INVENTOR.
GLENN E. MERCER
BY
ATTORNEY

United States Patent Office 2,782,962
Patented Feb. 26, 1957

2,782,962

SOLENOID OPERATED POWDERED MATERIAL DISPENSER

Glenn E. Mercer, Denver, Colo., assignor to Superior Manufacturing Co., Denver, Colo.

Application March 19, 1956, Serial No. 572,566

8 Claims. (Cl. 222—227)

This invention relates to a device for dispensing measured quantities of dry, powdered, or granular materials. It is more particularly designed for use in a coin-actuated beverage dispenser of the type in which the beverage is formed by intermixing dry materials with a liquid, and more specifically for dispensing powdered coffee, cocoa, milk, and the like, for intermixture with hot water in a coin-actuated coffee dispensing apparatus.

The principal object of the invention is to provide a simple, highly efficient, integral, combined material container and dispenser which can be quickly and easily installed in a beverage dispenser, either singly or in group combinations, and which will dispense an accurate, predetermined, measured amount of material in consequence of the closing of an electrical circuit.

Another object of the invention is to so construct the dispensing portion of the device that it can be quickly and easily regulated to dispense the desired quantity at each energization.

A further object is to so construct the dispenser that it will simultaneously act as an agitator to prevent packing, arching, or clogging in the powdered material and to provide a material discharge gate which will also serve as a material measuring element.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved material containing and dispensing device;

Fig. 2 is a front view thereof;

Fig. 3 is a longitudinal section through the lower portion of the improved device, taken on the line 3—3, Fig. 5, illustrating the dispensing elements thereof in the normal or closed position;

Fig. 4 is a similar fragmentary section, illustrating the dispensing elements in the actuated or open position; and Fig. 5 is a horizontal section, looking downwardly on the line 5—5, Fig. 3.

The improved material containing and dispensing device comprises an open-topped, rectangular container 10, preferably formed from molded plastic and having a relatively tall, thin, flat shape, with no protuberances on the flat sides thereof so that a plurality of the containers can be placed in contacting side-by-side relation in a dispensing apparatus with minimum space requirements.

The container 10 is formed with a flat forward bottom portion 11 joining a rear inclined bottom portion 12. The flat bottom portion 11 terminates in spaced relation to the front wall of the container to provide a discharge port 13 from which a dispensing chute 14 extends. An inclined, rearwardly and downwardly extending partition plate 15 is formed in the container 10 extending from side to side thereof. The partition plate terminates in approximate horizontal alignment with the upper rear extremity of the inclined bottom portion 12 and acts to direct the material in the container onto the rear inclined bottom portion 12. The latter acts to direct the material forwardly onto the flat bottom portion 11.

A flexible, resilient gate plate 16 is secured at its upper extremity to an indentation 17, formed in the front wall of the container, by means of suitable attachment bolts 18. The gate plate is formed from stainless spring steel, plated spring brass, or other resilient, flexible material, and extends from side to side of the container 10 to form a material discharge gate. The lower extremity of the gate plate 16 extends into the port 13 and the plate is constantly urged against the rear wall of the port 13 by the inherent resiliency of the gate material so as to prevent material in the container from reaching the port 13 until the gate plate 16 is flexed forwardly.

The gate plate 16 is flexed forwardly when desired by means of an electric solenoid 19 mounted in a solenoid frame 20 and designed to attract a solenoid armature 21. The solenoid frame 20 is secured to a bracket plate 22 formed on or secured to the front wall of the container 10. The frame 20 is secured to the bracket plate 22 by means of suitable clamp screws 23 which extend through slots 24, formed in the bracket plate 22, and through an angle clip 25 resting on the bracket plate 22. Thus, it can be seen that by loosening the screws 23, the frame 20 can be moved toward or away from the container 10 and can be secured in any desired preset position by tightening the screws 23 to clamp the clip 25 and the frame 20 against opposite sides of the bracket plate 22.

The forward and back adjustment of the solenoid can be very accurately regulated by means of a micrometer screw 26 threaded through an upstanding leg 27 on the angle clip 25. The screw 26 can be screwed against the front wall of the container 10 to force the solenoid frame 20 forwardly and accurately to the proper point and can be unscrewed while the solenoid frame is forced forwardly to adjust the solenoid frame rearwardly.

A gate arm 28 extends through an opening in the gate plate 16 and through an opening in the front wall of the container 10 and is connected to the armature 21 by means of a suitable cotter key 29. The gate arm is secured to, or molded integrally with, a transversely extending, semi-cylindrical scraper member 30 which rides on the flat bottom 11 of the container 10 and is provided with two oppositely extending stop bosses 31 positioned to contact a resilient sealing washer 32 to force the latter forwardly against the gate plate 16. An upturned spring finger 33 is formed on the rear extremity of the gate arm 28 upon which a flexible coiled spring 34 is mounted. The spring 34 extends flexibly upward into the material in the container 10.

Let us assume that the container 10 is filled with powered material, such as powdered coffee. The material will be forced rearwardly toward the inclined bottom 12 and pile forwardly beneath the partition 15 onto the flat bottom 11, as indicated by the dots in Fig. 3.

Now let us assume that the solenoid 19 is energized to attract the armature 21. This pulls the gate arm 28 forwardly, causing the bosses 31 to act against and swing the flexible gate plate forwardly to the position of Fig. 4, thus, opening the port 13 and allowing the powdered material, as shown at 37, to fall therethrough. The scraper member 30 will move forward simultaneously with the gate plate 16 to sweep a predetermined amount of the material 35 through the open port 13 as indicated in Fig. 4.

The solenoid acts to instantaneously snap the gate arm 28 forwardly. This instant forward movement flexes the spring 34, as shown in Fig. 4, giving it a flexible, whip-like action in the material 37 to agitate the latter to prevent arching or packing. The natural resiliency of the gate plate 16 instantly returns it to the closed position of Fig. 3 when the solenoid 19 is de-energized.

It can be seen that the stroke of the armature 21 is uniform. However, by moving the solenoid frame 20 toward the container 10, the bosses 31 will be moved rearwardly of the gate plate 16, so that these bosses will move a certain distance before they move the gate plate, so that the degree of opening of the gate plate 16 and the amount of movement of the scraper 30 can be accurately adjusted by adjustment of the screws 23 and the micrometer screw 26.

Having thus described the invention, what is claimed and desired secured by Letters Patent is:

1. A dispenser for powdered material comprising: a container; a front wall in said container; a bottom in said container, said bottom terminating in spaced relation to said front wall to form a bottom discharge port; a flexible gate plate secured to said front wall above said bottom and extending downwardly into engagement with the rear side of said port, said plate extending from side to side of said container so as to prevent powdered material therein from reaching said port when said plate is in engagement with said rear side; and means for flexing said gate plate forwardly so that its lower extremity will swing forwardly from said rear side to allow the powdered material to discharge from said port.

2. A dispenser for powdered material as described in claim 1 in which the means for flexing comprises: a gate bar; means on said gate bar for engaging said gate plate; and means for actuating said gate bar forwardly to flex said gate plate.

3. A dispenser for powdered material as described in claim 2 in which said gate bar extends forwardly through an opening in said gate plate and through an opening in said front wall and in which the means for actuating the gate bar is mounted on the exterior of said front wall.

4. A dispenser for powdered material as described in claim 3 in which the means for actuating comprises a solenoid supported from said container, and an armature positioned to be actuated by said solenoid, said armature being hingedly connected to the forward extremity of said gate bar.

5. A dispenser for powdered material as described in claim 4 having means for moving said solenoid toward and away from said container to vary the amount of flexure in said gate bar.

6. A dispenser for powdered material as described in claim 5 having a scraper member mounted on said gate bar and resting on said bottom for propelling material toward said port when said gate bar is flexed.

7. A dispenser for powdered material as described in claim 6 having an agitating member mounted on said gate bar and extending upwardly within said container to agitate the material therein in consequence of the movement of said gate bar.

8. A dispenser for powdered material as described in claim 7 in which the agitating member comprises a helical spring secured to said gate bar at its lower extremity and extending freely upward into said container.

No references cited.